United States Patent [19]

Double et al.

[11] Patent Number: 5,027,397

[45] Date of Patent: Jun. 25, 1991

[54] DATA PROTECTION BY DETECTION OF INTRUSION INTO ELECTRONIC ASSEMBLIES

[75] Inventors: Glen P. Double, Concord, N.C.; Steve H. Weingart, Peekskill, N.Y.

[73] Assignee: International Business Machines Corporation, Armonk, N.Y.

[21] Appl. No.: 405,910

[22] Filed: Sep. 12, 1989

[51] Int. Cl.$^5$ .............................................. H04L 9/00
[52] U.S. Cl. ........................................... 380/4; 380/3
[58] Field of Search ........................................ 380/3, 4

[56] References Cited

U.S. PATENT DOCUMENTS

| | | | |
|---|---|---|---|
| 3,594,770 | 7/1971 | Ham et al. | 340/273 |
| 3,851,602 | 12/1974 | Lamping | 109/23 |
| 4,413,327 | 11/1983 | Sabo et al. | 364/900 |
| 4,446,475 | 5/1984 | Gercekci et al. | 357/40 |
| 4,593,384 | 6/1986 | Kleijne | 380/3 |
| 4,639,826 | 1/1987 | Val et al. | 361/272 |
| 4,691,350 | 9/1987 | Kleijne et al. | 380/4 |
| 4,807,284 | 2/1989 | Kleijne | 380/3 |
| 4,811,288 | 3/1989 | Kleijne et al. | 380/4 |
| 4,860,351 | 8/1989 | Weingart | 380/3 |
| 4,882,752 | 11/1989 | Lindman et al. | 380/4 |

*Primary Examiner*—Thomas H. Tarcza
*Assistant Examiner*—Tod Swann
*Attorney, Agent, or Firm*—Calfee, Halter & Griswold

[57] ABSTRACT

The present invention provides an intrusion barrier for protecting against mechanical or chemical intrusion into an electronic assembly, especially one containing volatile memory. It includes a screen material surrounding the electronic assembly which screen material has formed thereon fine conductive lines in close proximity to each other. The lines are formed of conductive particles of material dispersed in a solidified matrix of a material which looses its mechanical integrity when removed from the screen. An electrical supply and signal detection circuit is provided which generates an output signal responsive to a given change in resistance of the conductive lines, such that if the resistance changes are a result of a mechanical or chemical attack, a signal is generated which can cause the erasure of the volatile memory. Also, preferably radiation detection and temperature sensing circuits are provided to cause erasure of the volatile memory responsive to detection of a given intensity of radiation or a temperature below a given value.

21 Claims, 6 Drawing Sheets

DATA PROTECTION BY DETECTION OF INTRUSION INTO ELECTRONIC ASSEMBLIES

BACKGROUND OF THE INVENTION

1. Field of the Invention

This invention relates generally to detection of intrusion into electronic assemblies, and more particularly, to the detection of intrusion by mechanical or chemical means for the purpose of reading the data stored in a memory.

In many computer applications, it is desirable to protect the contents of the computer memory from being unlawfully or unauthorizedly extracted and read. It is conventional practice to prevent reading of information electronically by providing certain encryption schemes wherein data is transmitted and received in an encrypted form and only authorized people who have the decryption key are able to read the data. There are many different types of encryption schemes which are useful in protecting the sensitive data against being read by unauthorized persons. Encryption keys and other sensitive data are often stored in I/C (integrated circuit) memory components within the computer. By use of software, the stored information is generally adequately protected from unauthorized persons using keyboard entries to attempt memory interrogation. However, an unauthorized person with the necessary skills and knowledge, and sufficiently motivated can by-pass software controls and attack the computer hardware directly. There are many attacks some straight forward and well known, others more sophisticated, that allow direct interrogation of memory components and devices. One scheme of protection against such attacks is to provide some type of detecting means which detect any attempted mechanical intrusion into the sensitive area of the computer and, when such intrusion is detected an alarm is given and/or a signal is sent to circuitry, which circuit erases the data, thereby preventing the compromise of the information which was stored in the computer memory components. Various schemes have been proposed which provide for some type of electronic or electrical grid surrounding the computer circuitry and, when this electrical grid is broken or breached, the requisite signal is generated. Schemes for such electronic detection are shown in U.S. Pat. No. 4,446,475 and 3,594,770. These types of systems, however, have several drawbacks. One such drawback is that many grids are susceptible to very careful mechanical manipulation to allow the memory device to be accessed without breaking or otherwise compromising the circuit. Also, certain of these systems are susceptible to a type of attack wherein the materials which support the electrical grid are chemically attacked leaving access areas exposed to circumvent the electrical grid thus allowing physical intrusion into the memory components.

Still other more sophisticated attacks, through temperature modification or though ionizing radiation (e.g. x-rays) affect volatile memory devices such that an erasure command is not effective, thereby allowing the electrical wrapping to be circumvented.

The present invention overcomes these defects by providing an outer intrusion detection layer that is highly resistant to chemical and mechanical attacks. Further, internal circuitry is provided to detect temperature and ionizing radiation attacks.

Use of detection for low temperatures to prevent tampering is shown in U.S. Pat. No. 4,593,384. Also, temperature responsive devices for safeguarding information are shown in U.S. Pat. No. 3,851,602. The use of means to limit effects of ionizing radiation are shown in U.S. Pat. Nos. 4, 413,327 and 4,639,826. However, neither of these patents suggest any means of security protection and/or erasing of information responsive to very high levels of radiation applied for purpose of attacking a volatile memory device to obtain sensitive information.

SUMMARY OF THE INVENTION

According to one aspect of the present invention, an intrusion barrier for protecting against mechanical or chemical intrusion into an electronic assembly is provided. The barrier includes a screen material surrounding the electronic assembly. The screen material has formed thereon fine conductive lines in close proximity to each other in a pattern that limits the mechanical access which can be achieved without disturbing the resistive characteristics of at least one line or line segment. The lines are formed of conductive particles of material dispersed in a solidified matrix of material which loses its mechanical integrity when removed from the screen substrate. Electrical supply and signal detection means are provided which are adapted to supply a signal to the conductive lines and generate an output signal responsive to a given change in the resistance of the conductive lines whereby, when the resistance of the conductive lines changes, either as result of chemical attack or mechanical attack, a signal is generated. This signal can be made to cause the erasure of information in the memory component. In other aspects of the present invention, radiation detection means are provided which generate a signal when radiation is detected above a given intensity and which signal is utilized to cause the erasure of information contained in the memory component before the radiation has reached a level adequate over a reasonable period of time to prevent erasure. In still further aspects, the invention includes temperature sensing means which generates an electrical signal responsive to a temperature which is lower than a predetermined value and which signal is used to cause the erasure of information contained in the memory component, before the temperature of the memory component has reached a temperature low enough to cause a significant number of its storage locations to retain their information even after erasure is attempted.

DESCRIPTION OF THE PREFERRED EMBODIMENT

Figure 1:
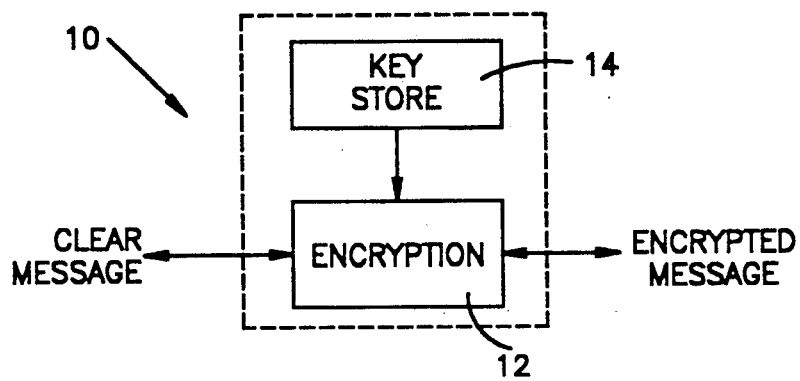
FIG. 1 is a schematic view of a message encryption/-decryption system.

Referring now to the drawings and for the present to FIG. 1, a conceptual schematic drawing of a message encryption/decryption facility is shown in broken outline 10. The clear message which is to be encrypted is delivered to encryption means 12 which in turn encrypts the clear message via key store 14 to provide an encrypted message. The encryption keys in key store 14 as well as the encryption 12 must be protected from interrogation because if an unauthorized person were to have access to these keys and the encryption process, the clear messages could be derived from encrypted data and misused indiscriminately.

Figure 2:
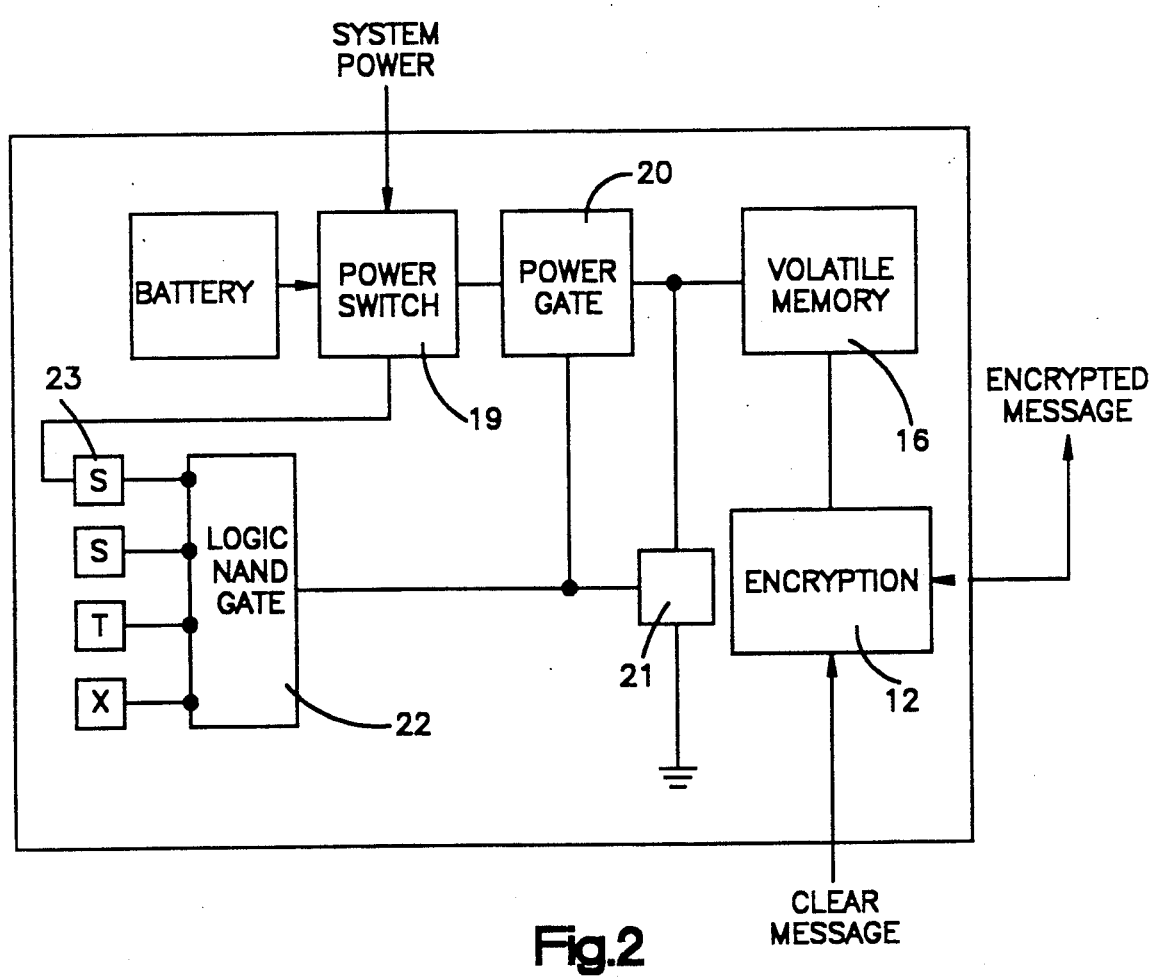
FIG. 2 is a schematic view of the operation of the encryption/decryption system and means to detect and prevent unauthorized interrogation of the system.

The conceptual block diagram in FIG. 2 shows the scheme of the present invention for detecting and preventing unauthorized interrogation of the stored encryption keys in key store 14. For the purpose of this invention, the encryption keys are retained in a volatile memory 16. The volatile memory 16 is powered by either a battery or system power determined by power switch 18. Power to the memory is controlled by power gate 20 and shorting transistor 21 via detection logic NAND gate 22 which in turn is actuated by sensor circuits designated S, T and X. (Of course, more sensor inputs could be used if desired.) Sensor circuit S, which will be described presently in detail, detects mechanical or chemical intrusion; sensor circuit T, which will be described presently in detail, detects temperature excursions; and sensor circuit X, which will be described presently in detail, detects exposure to radiation. As is well known in the art, the logic NAND gate 22 will normally be in the "low" or "off" condition if all inputs are "on" or "high"; however, if any input goes "low", then the NAND gate output 22 goes "high" providing a signal to other components attached to it. Such a signal from the NAND gate output will cause the power gate 20 to disconnect the memory 16 from power and cause shorting transistor 21 to short the power pin of the memory to ground thus erasing the memory quickly. Thus, if any one of the sensor inputs changes from "high" to "low", as a result of certain predetermined conditions indicating an attack the NAND gate 22 will turn "on" and the data from memory 16 will be quickly erased. Each of these particular detecting circuits will be described presently.

Figure 3:
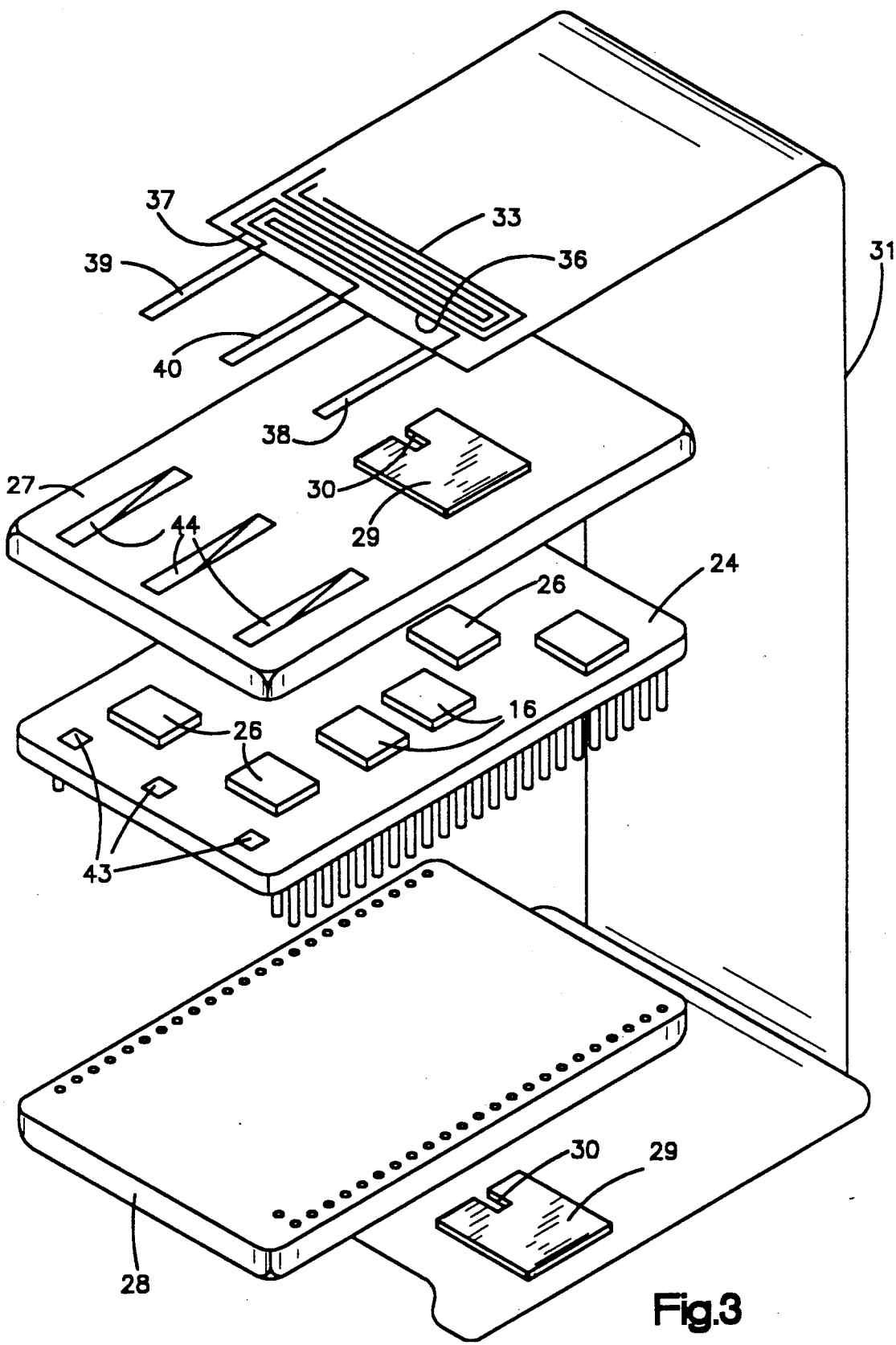
FIG. 3 is an exploded perspective view of a circuit card with various devices and components mounted thereon which constitute the system to be protected, and, showing plastic preforms which mate with the card to provide the form-factor for wrapping the flexible screen membrane.

As shown in FIG. 3, a circuit card 24 is provided which contains thereon the various components for encryption, key storage in volatile memory 16, the battery and the protection circuitry for the volatile memory for the encryption/decryption facility 10. The components other than the volatile memory 16 are designated generally as 26, all being shown conceptually. These components also include a battery. The specific location, number and function are not critical to this invention.

Disposed over each side of the circuit card 24 are a pair of plastic preforms 27 and 28 which fit over the components and provide the proper control surface or form-factor for the wrapping of the screen member which will be described presently. If the circuit card 24 employs pins, then holes (unnumbered) or slots to receive such pins are provided in preform 28. Patterned Lead foil sheets 29 are placed on the plastic preforms 27 and 28 so as to provide a radiation shield on both side of the volatile memory storage components 16. The foil sheets 29 have cut out portions 30 to accommodate the positioning of a radiation sensor as will be described presently. The circuit card 24, the preforms 27 and 28 and the Lead sheets 29 are all stacked in superimposed relationship so as to receive a screen member 31 (FIGS. 3 through 6) wrapped therearound which will form the barrier against any unauthorized attempts at mechanical or chemical intrusion to the circuit card 24.

Figure 4:
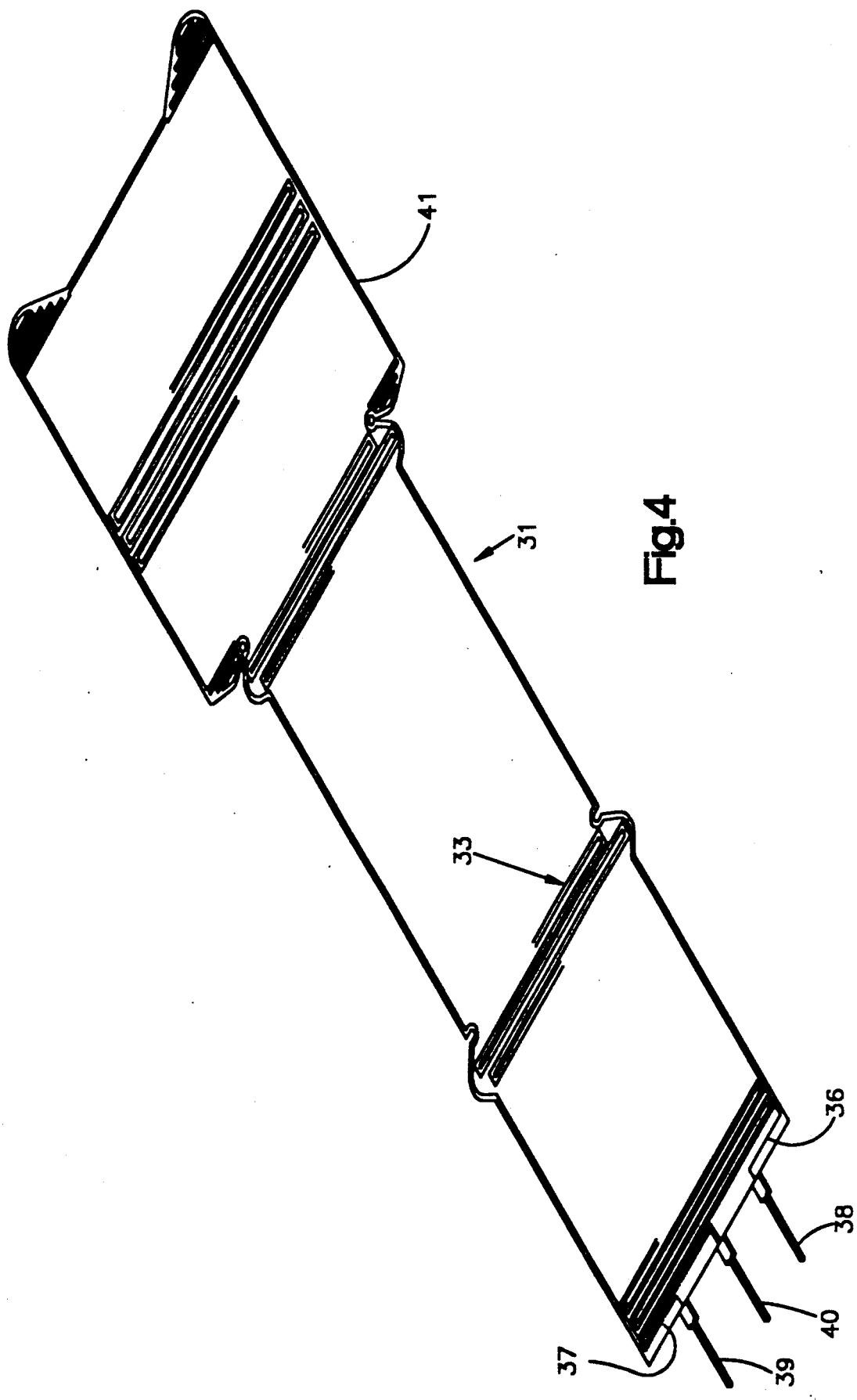
FIG. 4 is a perspective view, somewhat diagrammatic showing a flexible screen member used in this invention.
Figure 5:
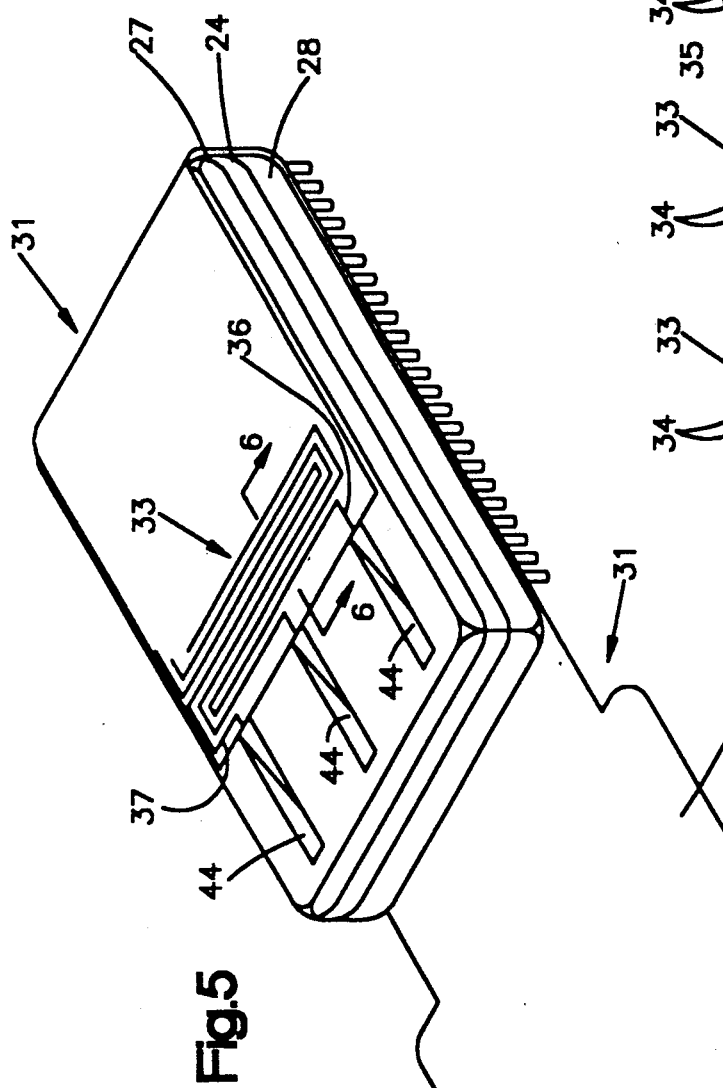
FIG. 5 is the system of FIG. 3 showing the flexible screen member partially wrapped thereon with screen leads attached to the circuit card.
Figure 6:
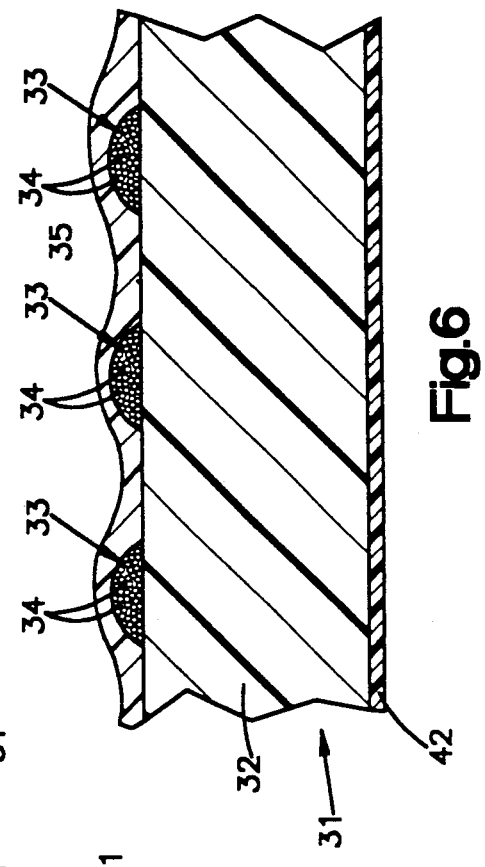
FIG. 6 is a sectional view taken substantially along the plane of line 6—6 of FIG. 5.

As seen in FIGS. 4 through 6, the screen member 31 is comprised of a tough flexible substrate such as film 32 of Mylar (a trade mark of E. I. DuPont Co. for polyethylene terepthalate) having a serpentine pattern of screened conductive lines 33 thereon. The lines 33 are comprised of conductive particles 34 such as particles of silver and carbon which are dispersed in an organic matrix material such as polyvinyl chloride. These lines 33 are screened onto the Mylar film by conventional screening processes and are sufficiently close together and of a size to provide a deterrent to mechanical probing of the circuit card. A preferred geometry comprises lines 0.25 mm wide and 0.013 mm thick and spaced on about 0.5 mm centers. A thin acrylic film 35 (FIG. 6) over the lines 33 provides environmental protection to the lines, from such things as moisture and atmospheric contaminants. Referring to FIG. 4, the lines 33 are screened onto the substrate 32 by conventional silk screening techniques in a serpentine pattern such that they form two legs or segments 36 and 37 of substantially equal resistance, one leg 36 terminating in an electrical contact 38 and the other leg 37 terminating in an electrical contact 39, both legs 36 and 37 having a common center electrical contact 40. Two legs 36 and 37 will act as two resistance legs in a bridge circuit, which will be described presently.

The screen is formed with a pair of side flaps 41 which serve to protect the edges of the circuit card as will be described presently.

Figure 7:
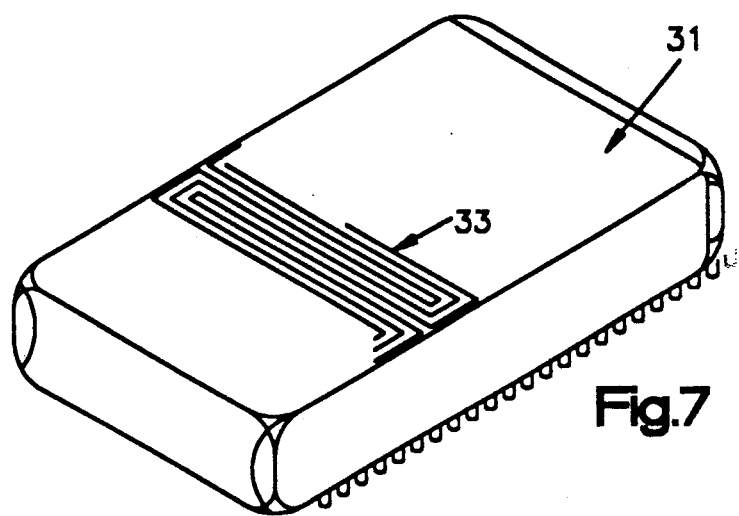
FIG. 7 is a view similar to FIG. 5 in which the screen is wrapped onto the circuit card with parts broken away for clarity.
Figure 8:
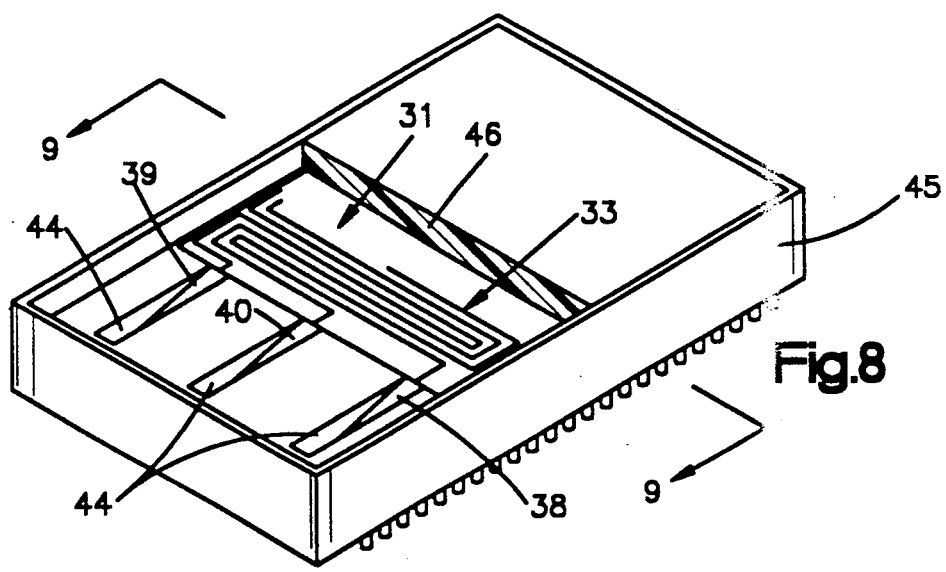
FIG. 8 is a view similar to FIG. 6 showing the assembly encapsulated in epoxy and contained in a steel container.
Figure 9:
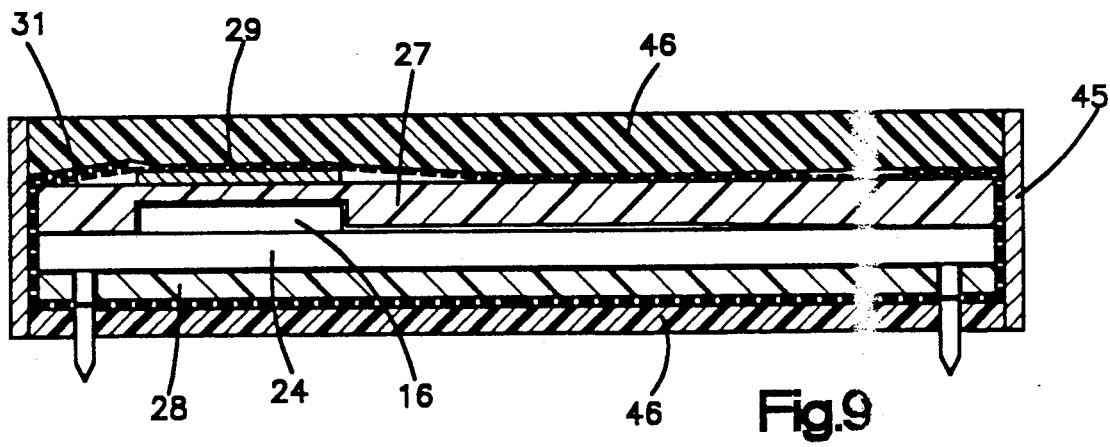
FIG. 9 is a sectional view taken substantially along the plane of line 9—9 of FIG. 8.

The substrate 31 is also preferably provided with an adhesive backing 42, and as shown in FIG. 5, the screen member 31 is partially wrapped around the superimposed circuit card, plastic preforms and lead strips. The electrical contacts 38, 39 and 40 are connected to their respective terminals 43 on the circuit card 24 through openings 44 in the preform 27. These terminals 43 are mainly schematic or conceptual representations of the contact points on the card 24 to connect to the circuit shown in FIG. 10. The remaining portion of the screen membrane is then wrapped around completely to cover the screen contacts and the side flaps 41 are folded over the preform sides as shown in FIG. 7. This configuration provides a card with components thereon which is essentially completely enclosed with a screen that has conductive line formed thereon with the adhesive 42 providing a bond to the preforms 27 and 28. The assembly shown in FIG. 7 is then placed in a steel container 45 and completely encapsulated with a thin layer of epoxy 46 which becomes very hard and brittle upon curing as shown in FIGS. 8 and 9. The container 45 provides a degree of EMI shielding for the circuit card 24 components. The epoxy 46 is chosen such that it is harder and more brittle, and more rugged and durable than the materials making up the screen number. Attempts to mechanically remove the epoxy 46 will result in a variety of fracture modes which will in turn cause lines 33 to break or rupture when the epoxy fractures. The bonding of the epoxy 46 to the screen is of a type such that it is extremely difficult to separate the epoxy mechanically from the screen without disrupting the underlying lines 33. Further, the strength of the bond of the epoxy 46 to the lines 33 is stronger than the strength of the bond of the lines 33 to the substrate 32 and thus will thwart any attempted mechanical intrusion through the epoxy 46 and screen 31 to get to the volatile memory components 25. The epoxy material 46 is chosen such that the epoxy and the materials making up the screen number 31 are both subject to attack by similar solvents or reagents, and thus attempts to dissolve the epoxy 46 are highly likely to result in chemical attack of the lines 33 by the solvent which will cause changes in resistance which may even become either shorts, or opens in the lines 33.

Figure 10:
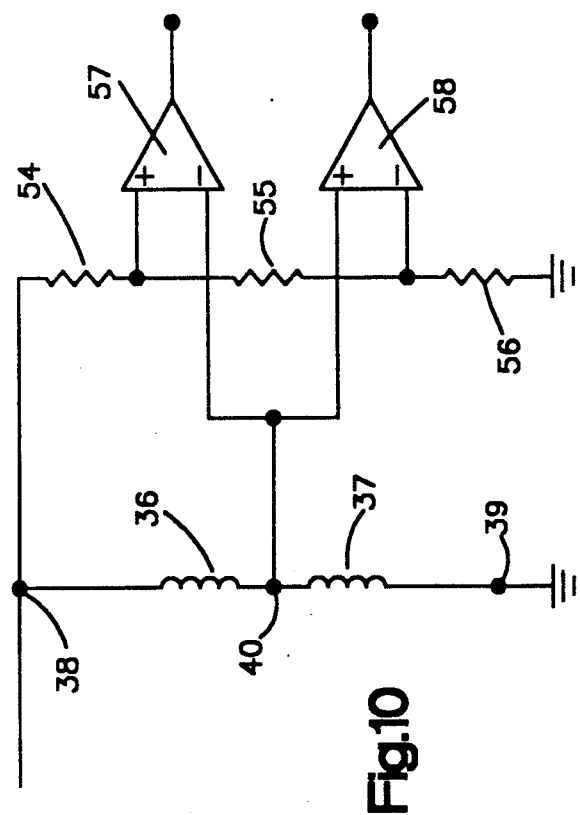
FIG. 10 is a circuit diagram of a circuit used for detecting mechanical or chemical intrusion through the screen member.

The contacts 38, 39 and 40 are attached to a circuit for the Sensor S through terminals 44 on the card 24 as shown in the circuit diagram of FIG. 10. The circuit includes resistor 54, 55 and 56 connected in series, and a pair of operational amplifiers 57 and 58. The negative input of operational amplifier 57 and positive input of operational amplifier 58 are connected to the center contact 40 of the lines 33. Contact 38 of line 33 is connected to system power or battery via power switch 18 and contact 39 of line 33 is connected to ground. The resistors 54, 55, and 56 are connected in series between system power or battery and ground. Resistors 54 and 56 are chosen to be of equal value. The value chosen for resistor 55 in relationship to the value of resistors 54 and 56 provides upper and lower bounds on the resistance differences between the legs 36 and 37 of the screen. The positive input of operational amplifier 57 is connected between resistors 54 and 55 and the negative input of amplifier 58 is connected between resistors 55 and 56. In this configuration, when the resistance of legs 36 and 37 of lines 32 are equal, both amplifiers 57 and 58 will be turned on. However, if the resistance of either leg 36 or 37 is substantially increased or decreased beyond the bounds set by resistor 55, the bias of the operation amplifiers 57 and 58 will change such that one or the other will turn "off" thus changing the input to NAND gate 22 from "high" to "low". As explained previously, this will cause the output of NAND gate 22 to go from "low" to "high", supplying the necessary signal to turn "off" power gate 20 and turn "on" shorting transistor 21 which will quickly erase the information stored in volatile memory 16. The change in resistance of legs 36 or 37 can be due either to breaks or shorts in either of the legs caused by an attempted intrusion, or by a slow change in resistance of the legs 36 or 37 caused by a chemical attack or by other means. Thus, the circuit shown in FIG. 10 will respond to attempted mechanical or chemical intrusions by sending a signal to the NAND gate 22 which in turn will send a signal to cause the erasure of information before the intrusion is complete and the volatile memory can be read.

As indicated previously, there are various special attacks whereby screen barriers can be thwarted, compromised, or by-passed without losing data or memory, if extra precautions are not taken. Two such attacks involve controlled exposure to ionizing radiation and, exposure to low temperatures. The circuitry shown in FIG. 11, detects both visible and ionizing radiation and causes the memory 16 to be erased before ionizing radiation is able to permanently affect the volatile memory. The circuit in FIG. 12 detects temperature excursions below a predetermined value and causes the memory to be erased before a critical low temperature affects the volatile memory.

Figure 11:
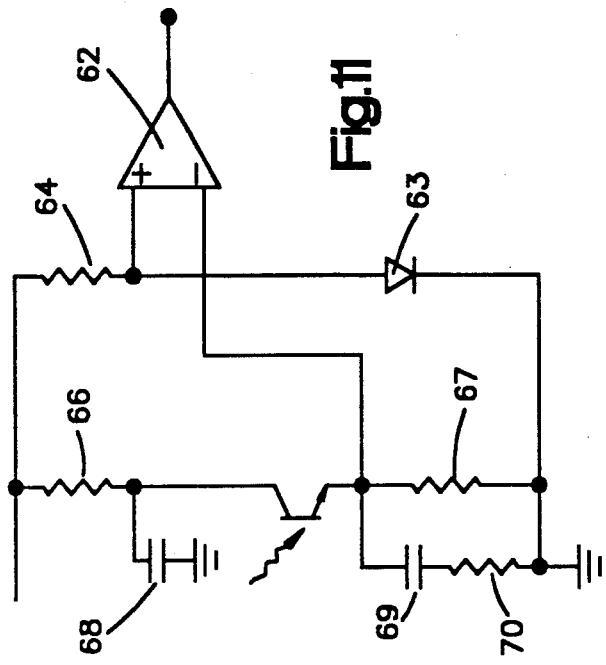
FIG. 11 is a circuit diagram of the circuit used for detecting and obtaining of data by use of high intensity radiation.

The circuit for Sensor X, which is responsive to both visible and ionizing radiation is shown in FIG. 11. This circuit includes an operational amplifier 62 having one side connected to diode 63 in series with a resistor 64, the combination of which provides a reference voltage to the positive input of the operational amplifier 62. The negative input of the operational amplifier 62 is connected between a photosensitive device 65, such as a Photo-Darlington pair or a phototransistor, and resistor 66 to system power or battery via power switch 18 and through resistors 67 to ground. Capacitors 68 and 69 and resistors 66 and 70 have been provided for noise filtering. The photosensitive device is located on the card 24 so that it is not blocked by the lead foil sheets 29, preferably adjacent to the volatile memory chip 16 under the notch 30 of the lead foil sheet such that attempted radiation of this component 16 will also expose the photosensitive device 65 to radiation. In normal operation, the photosensitive device 65 is nonconducting in the absence of radiation and the operational amplifier 62 is biased "on". However, when the photosensitive device senses radiation (either ionizing or in the visible spectrum) of sufficient intensity, it will conduct current which will change the bias on the operational amplifier 62 turning it "off". This will cause the NAND gate 22 to turn "on" and provide a signal to power gate 20 and shorting transistor 21 to cause information stored in volatile memory 16 to be erased as previously described.

Figure 12:
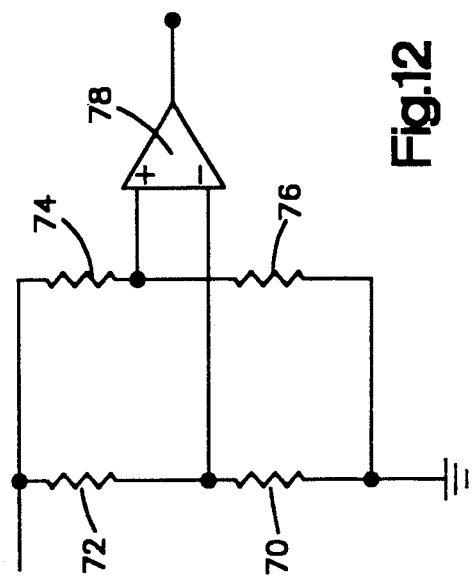
FIG. 12 is a circuit diagram of the circuit used for detecting and preventing obtaining of information by low temperature excursions.

The circuitry of Sensor T is shown in FIG. 12. In this circuit three resistors 72, 74 and 76, together with resistor 70, provide the four legs of a bridge circuit, which circuit is connected to operational amplifier 78. Resistor 70 is a thermistor having a negative temperature coefficient of resistance, i.e. its resistance increases with decreasing temperature. The value of the three resistors 72, 74 and 76 are chosen to bias operational amplifier 78 normally "on" within the operating temperature range, and to bias the amplifier "off" at a chosen temperature. The value of resistor 76 is chosen based on the temperature characteristics of thermistor 70. Thus in normal operation the operational amplifier 78 is normally biased "on", but when the temperature falls below a selected low value, e.g. 0° C. or −20° C. or some other value related to the temperature dependent retention characteristics of volatile memory 16, the operational amplifier 78 will turn "off" which as described above, will cause the NAND gate to give a signal which will cause erasure quickly of the information stored in volatile memory 18.

While one embodiment of this invention has been shown and described various adaptations and modifications may be made without departing from the scope of the invention as defined in the appended claims. For example, the NAND gate can be replaced with other logic circuits performing a logical "or" function to cause erasure of the memory if any one of a number of events are sensed indicating that an intrusion is being attempted. Additional sensors could be used to detect other evidence of intrusion.

What is claimed is:

1. An electronic circuit comprising;
   a circuit card;
   a plurality of electronic circuit components disposed on said circuit card;
   said components including an electronic assembly;
   a barrier for protecting against intrusions into said electronic assembly including;
   screen means surrounding said electronic assembly, said screen means including a unitary flexible membrane wrapped around said electronic assembly and line means formed on said membrane in a pattern that resists access without disturbing said line means, said line means being formed of discrete conductive particles of material disposed in a solidified matrix of material, the resistance of said line means changing when said line means are disturbed,
   encapsulating material encapsulating said line means and bonded to said line means said bond strength of line means to the membrane having a first predetermined strength and said bond strength of the encapsulating material to the line means having a second predetermined strength said second predetermined strength being greater than said first predetermined strength;
   and, electrical supply and signal detection means adapted to supply an input signal to said line means and generate an output signal responsive to a given change in said resistance of said line means;
   whereby said resistance of said line means changes, a signal will be generated.

2. The invention as defined in claim 1 wherein the electronic assembly includes volatile memory means, and wherein means responsive to said output signal are provided to erase data contained in said volatile memory means.

3. The invention as defined in claim 2 wherein said line means further comprises a plurality of line segments, and where said electrical supply and detection means detects changes in resistance between two of said line segments.

4. The invention as defined in claim 3 wherein said line means form a part of a voltage divider circuit.

5. The inventions defined in claim 4 wherein means are proved to generate a signal responsive to the change in resistance of said line segments in said voltage divider circuit.

6. The invention as defined in claim 5 wherein said signal is generated by amplifier means connected to said voltage divider circuit.

7. The invention as defined in claim 2 further characterized by means to detect a temperature excursion below a given temperature value and generate an output signal responsive to the detection of said temperature excursion.

8. The invention as defined in claim 7 wherein said means to detect said temperature excursion includes second circuit means having means to provide a reference signal to control response to said temperature excursion.

9. The invention as defined in claim 8 further characterized by means to detect radiation above a given value and generate said output signal responsive to said detected radiation.

10. The invention as defined in claim 8 wherein said second circuit includes temperature sensitive resistance means which varies its output as a function of temperature.

11. The invention as defined in claim 10 wherein said second circuit is a reference bridge circuit, 12. The invention as defined in claim 10 wherein said output signal is generated by an amplifier connected in circuit relationship with said second circuit.

13. The invention as defined in claim 2 further characterized by means to detect radiation intensity above a given value and generate an output signal responsive to said detected radiation.

14. The invention as defined in claim 13 further characterized by radiation shielding means disposed to reduce radiation received by said volatile memory as compared to radiation received by said means to detect radiation.

15. The invention as defined in claim 13 wherein said means to detect radiation includes third circuit means having means to vary a characteristic thereof responsive to said detected radiation.

16. The invention as defined in claim 15 wherein said means to vary the characteristics thereof is a photosensitive device in said third circuit.

17. The invention as defined in claim 16 wherein said third circuit includes an operational amplifier which produces said output signal.

18. The invention as defined in claim 2 wherein gate means are provided to generate said output signal.

19. The invention as defined in claim 2 including switch means to turn off the power to said volatile memory responsive to the output signal.

20. The invention as defined in claim 19 further characterized by transistor means to short said volatile memory in response to said output signal.

21. The invention as defined in claim 2 further characterized by means to provide for EMI shielding.

* * * * *